(12) United States Patent
Biester

(10) Patent No.: US 7,048,004 B2
(45) Date of Patent: May 23, 2006

(54) VALVE SYSTEM

(75) Inventor: Klaus Biester, Wienhausen (DE)

(73) Assignee: Cooper Cameron Corporation, Houston, TX (US)

( * ) Notice: Subject to any disclaimer, the term of this patent is extended or adjusted under 35 U.S.C. 154(b) by 0 days.

(21) Appl. No.: 10/467,112

(22) PCT Filed: Oct. 30, 2001

(86) PCT No.: PCT/EP01/12550

§ 371 (c)(1),
(2), (4) Date: Aug. 5, 2003

(87) PCT Pub. No.: WO02/063191

PCT Pub. Date: Aug. 15, 2002

(65) Prior Publication Data

US 2004/0074544 A1    Apr. 22, 2004

(30) Foreign Application Priority Data

Feb. 8, 2001    (DE)    ............................ 201 02 168 U

(51) Int. Cl.
*E15B 13/02*    (2006.01)
(52) U.S. Cl. .................. 137/625.68; 251/171; 251/190
(58) Field of Classification Search ........... 137/625.25, 137/625.35, 625.38, 625.45, 625.67, 625.68, 137/454.6; 251/170, 171, 186, 190
See application file for complete search history.

(56) References Cited

U.S. PATENT DOCUMENTS

| | | | | |
|---|---|---|---|---|
| 2,119,534 A | * | 6/1938 | Gerber | ........................ 137/596 |
| 2,645,450 A | * | 7/1953 | Chessman | .............. 137/625.68 |
| 3,089,509 A | * | 5/1963 | Collins | ..................... 137/454.6 |
| 3,429,341 A | | 2/1969 | Sochting | ................. 137/625.68 |
| 3,452,776 A | * | 7/1969 | Chenoweth | ............... 137/454.6 |
| 4,548,383 A | * | 10/1985 | Wolfges | ....................... 251/29 |
| 4,725,039 A | | 2/1988 | Kolchinsky | ............ 251/129.08 |

(Continued)

FOREIGN PATENT DOCUMENTS

DE    33 16 258    11/1984

(Continued)

OTHER PUBLICATIONS

Brusewitz, M.; *Elecktrochemische Aktoren*; F&M Feinwerktechnik Mikrotechnik Mikroelektronik; vol. 106, No.7/8; Jul. 1998 (pp. 527-530).

*Primary Examiner*—John Fox
(74) *Attorney, Agent, or Firm*—Conley Rose, P.C.

(57) ABSTRACT

The invention relates to a valve system (1) with at least one valve body (2) and a longitudinal slide (3) slidably dispsoed therein which establishes or disrupts a connection between a feed line (4) and at least one inlet (5, 6) or outlet (7, 8) in the valve body 92). The valve system further comprises an electrochemically driven actuator (9) that displaces the longitudinal slide. The aim of the invention is to improve the valve system by simplifying the design of the valve body and the longitudinal slide and to provide a secure and reproducible connection between the inlet/outlet and the feed line in order to feed a corresponding actuating device with a hydraulic fluid. To this end, the longitudinal slide (30 has a longitudinal bore (10) connected to the feed line (4), which can be linked with the inlet (5, 6) or outlet (7, 8) via at least one connecting line (11, 12) that substantially extends radially outward from the longitudinal bore by displacing the longitudinal slide (3) by means of the actuator (9).

34 Claims, 1 Drawing Sheet

U.S. PATENT DOCUMENTS

| | | | | |
|---|---|---|---|---|
| 5,832,996 | A | * | 11/1998 | Carmody et al. ............. 166/53 |
| 6,142,171 | A | * | 11/2000 | Hancock ..................... 137/271 |
| 6,494,294 | B1 | * | 12/2002 | Naiki et al. .................. 184/34 |

FOREIGN PATENT DOCUMENTS

| | | |
|---|---|---|
| DE | 90 05 411 | 8/1990 |
| FR | 2 309 748 | 11/1976 |

* cited by examiner

VALVE SYSTEM

CROSS-REFERENCE TO RELATED APPLICATIONS

This application is a National Phase entry of PCT Application No. PCT/EP01/12550 filed 30 Oct. 2001 which claims priority to German Application No. 201 02 168.4 filed 08 Feb. 2001, both of which are incorporated herein by reference.

STATEMENT REGARDING FEDERALLY SPONSORED RESEARCH OR DEVELOPMENT

Not Applicable.

BACKGROUND

The invention concerns a valve system with at least one valve body and a longitudinal slide slidably disposed therein which establishes or disrupts a connection between a feed line and at least one inlet or outlet in the valve body, and having an electrochemically driven actuator that displaces the longitudinal slide.

Such valve systems are known internally, for example for applications in petroleum or natural gas extraction or the like. Depending on the position of the longitudinal slide, a feed line having an inlet or outlet for a hydraulic fluid is connected by valve bodies and longitudinal slides movably disposed therein. An actuation device is provided with hydraulic fluid via the feed line, this actuation device being used, for example, for adjusting a throttle, for actuating a so-called blowout preventer for actuating a valve, or the like.

In order to be able to operate and control this valve body and longitudinal slide of the valve system precisely and reproducibly, it has already been proposed that electrical actuation be performed instead of pneumatic or hydraulic actuation of the valve system. Such an electric actuation takes place, for example, via electromagnets or the like. Of course, such electromagnets often lead to considerable heat development, are very heavy, and require some expense for the control. Therefore it was proposed that the longitudinal slide be moved by means of an electrochemically operated actuator.

In the case of an electrochemically operated actuator a gas, and in particular hydrogen, is generated by electric charge in an expandable piece. This causes an over-pressure in the body, which leads to the expansion thereof and correspondingly to the actuation thereof. In order to make the motion of the longitudinal slide and correspondingly the expansion of the body of the actuator retrogressive, it is advisable to discharge the actuator via a resistor. Thus the hydrogen is consumed within the actuator and the pressure is reduced.

Such an electrochemically operated actuator is very small, light, and reliable. In addition, such an electrochemically operated actuator is very high in its positioning accuracy with respect to the longitudinal slide and requires no energy for maintaining the longitudinal slide in a specific position.

SUMMARY OF THE PREFERRED EMBODIMENTS

The object of the invention is to improve such an internally known valve system of the type named above by simplifying the design of the valve body and the longitudinal slide and reliably making a connection between the inlet/outlet and the feed line in order to feed a corresponding actuating device with hydraulic fluid securely and reliably.

This object is achieved in accordance with the features of the preamble of claim 1 in that the longitudinal slide has a longitudinal bore connected to the feed line which can be linked with the inlet or outlet via at least one connecting line that substantially extends radially outward from the longitudinal bore by displacing the longitudinal slide by means of the actuator.

In this way the connection between feed line and inlet/outlet is made only via the longitudinal bore of the longitudinal slide and a connecting line branching therefrom. The liquid connection between longitudinal bore and feed line remains independent of the position of the longitudinal slide radially to the valve body and the connecting line is correspondingly connected with an inlet or outlet for feeding or removing hydraulic fluid only by displacing the longitudinal slide by means of the actuator.

In order to achieve a compact construction for the valve arrangement, the discharge end of the longitudinal slide may be connected with the actuator, and the longitudinal bore may open in its inlet end opposite the discharged end.

A series of valves may be located in a very narrow space because of the compact design and, in particular, also the use of the electrochemical actuator, so that the valve arrangement can have a number of valve bodies having longitudinal slides and associated actuators located in a valve block for feeding actuating devices with hydraulic fluid.

In order to be able to arrange a corresponding valve in the valve block in a simple way, at least valve bodies and longitudinal slides may be releasably located in a valve holding recess of the valve block.

Since the electrochemical actuator is relatively insensitive and in order to supply it with electricity more easily, a housing may be made in the valve block for receiving the actuator.

In order to be able to maintain the electrochemical actuator, the housing may be closed on its side facing the valve block by means of a housing cover releasably fastened to the valve block, through which the longitudinal slide is guided into the interior of the housing. In this case it is possible to open the housing without loosening the housing cover from the valve block, in order to obtain access to the electrochemical actuator.

In order to be able to determine both the arrangement of valve body and longitudinal slide as well as of the housing relative to the valve body by means of the housing cover, the housing cover has a peripheral flange for mounting on a peripheral edge of the valve holding recess on an outside of the valve body.

In order to be able to design corresponding valves of the valve system more simply, and to be able to optimally use the internal adjustment of the electrochemical actuator, the feed line can open into the valve holding recess lying opposite the housing cover. In this way the longitudinal slide is moved by the actuator and through the housing cover directly in the direction of the feed line. In this case the fluid connection between the longitudinal bore and the feed line always exists.

The valve block is made so that corresponding inlet and outlet channels are made directly in it for providing each valve with fluid. In order to seal these channels securely with respect to the external surroundings of the valve block, and at the same time to be able to make a connection to the feed line in a simple way, inlet and outlet channels may open laterally between feed line and housing cover into the valve holding recess.

As a rule the valve body is made in several parts. In order to obtain the valve body designed in the simplest way, the latter may have a central body releasably connected with the housing cover, in which a mounting hole connecting housing cover and feed line is made for receiving the longitudinal slide. In this case the longitudinal hole extends correspondingly for extending the longitudinal slide between housing cover and connecting line.

A simple possibility for forming outlets and/or inlets in the case of the corresponding valve body may be seen in the fact that outlet and/or inlet are formed directly in the central body and/or between the latter and the housing cover.

An improved feed and removal of hydraulic fluid may be achieved, for example, by the fact that outlet and/or inlet in each case are made overlapping each other in pairs in the valve body.

The feeding with hydraulic fluid, respectively the removal thereof may be further improved by correspondingly providing two pairs of outlets and/or inlets in the valve body. Then, for example, these altogether four outlets in each case are located at right angles to one another around the longitudinal slide, the longitudinal slide being provided with a corresponding number of connecting lines.

In order to simplify, on the one hand, the connection between central body and housing cover and, on the other hand, the arrangement of outlet or inlet in a simple way, the central body may have a annular flange in the direction of the housing cover, in which open through holes to the outlet channel and in the direction of the connecting line. These through holes form at least a part of the inlet or outlet.

A annular channel may be made between the through holes and the outlet channels in order to be able to remove hydraulic fluid uniformly via all outlet channels.

In this connection it is furthermore advantageous if a further annular channel also is located between through holes and connecting lines. This also equalizes the distribution of hydraulic fluid to all two or four outlets and corresponding outlet channels.

In order to make it possible to feed hydraulic fluid under pressure to the feed line in the valve body in a simple way, the central body may have insertion holes connecting inlets and longitudinal slide, into which at least one inlet element is inserted.

In order to be able make the inlet element variable as required, this may have a sealing body with a central hole and a guide body holding the sealing body in the insertion hole.

A simply designed and reliably working guide piece may, for example, have a cap element somewhat dome-shaped in cross-section and a half-round snap ring holding the latter in the insertion device.

In order to ensure that hydraulic fluid may be fed only via the middle hole to the longitudinal hole of the longitudinal slide, a sealing element may be located between cap element and sealing body.

Furthermore in order to be able to mount central body and housing cover tightly in the valve holding recess of the valve block, along an outer periphery of the central body sealing elements may be located between inlets and outlets and inlets and feed line as well as between housing cover and holding recess.

In order to be able make the inlet element more simply in particular in the case of four inlets, the latter may be made essentially annular, and extend around the longitudinal slide. In this case at the corresponding points of the inlet element facing the inlet channels, corresponding middle holes are made in the longitudinal slide for connecting the inlet channels with the connecting lines. In accordance with the invention, in particular with the maximum possible opening cross-section, hydraulic fluid is to be connected through the valve system.

In order to make the feed uniform via all four inlet channels, the middle holes may be connected by an annular channel facing the longitudinal slide and surrounding the latter.

An easily produced embodiment for an annular channel may be seen in the fact that the cross-section of the latter is made as a recess passing in funnel-shape in the direction of the throttle hole in the sealing body.

In order to be able to close the valve body in the direction of the feed line and achieve a flat fitting on a bottom of the valve holding recess at the same time, an end washer, which has a central hole approximately in the middle, may be releasably mounted on the side surface of the central body facing the feed line, in which the longitudinal slide is mounted capable of moving with its inlet end. In this connection in order to be able to establish a position of the longitudinal slide, in particular for feeding the feed line with fluid, an edge of the central bore can form a stop for the longitudinal slide. In this position the longitudinal slide is displaced through the electrochemical actuator as far as possible in the direction of the feed line. The other fluid outlet position may, for example, be established by the fact that the longitudinal slide is in position with a corresponding mounting surface in the housing cover.

Moreover, in order to seal the valve body in the valve holding recess and to locate a corresponding sealing element in a simple way, the end washer may have a sloped edge, between which and a rotating corner of the holding recess a sealing element is mounted.

As a rule, the electrochemical actuator has a cylindrical shape, a discharge element, that is connected with the cylindrical housing via a bellows connection, being located on one of its ends. In order to be able to attach the longitudinal slide to the actuator in a simple way, a holding plate, that is releasably connected with the discharge element of the actuator, extending transverse to the longitudinal slide may be located on the connecting end of the longitudinal slide.

BRIEF DESCRIPTION OF THE DRAWINGS

An advantageous embodiment of the invention is explained in greater detail below by means of the figures appended in the drawing.

DETAILED DESCRIPTION OF THE PREFERRED EMBODIMENTS

Figure 1:
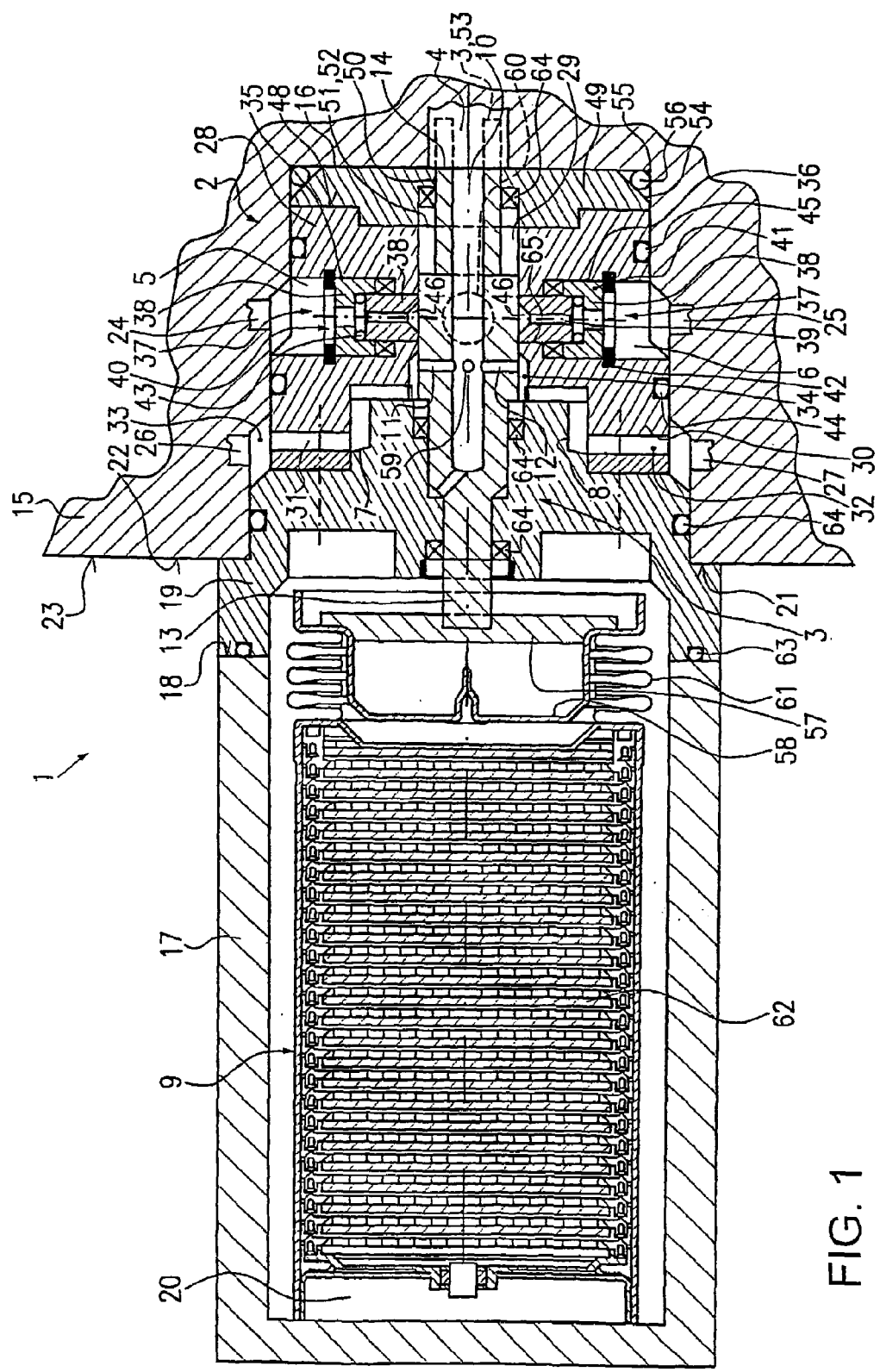
FIG. 1 shows a longitudinal section through a specific embodiment of a valve system in accordance with the invention, having a valve and associated electrochemical actuator.

FIG. 1 shows a longitudinal section through a specific embodiment of a valve system according to the invention 1 with a valve body 2 and a longitudinal slide 3 in a valve housing recess 16 of a valve block 15.

Valve block 15 has a number of further valve holding recesses 16 (not shown), in which corresponding valve bodies 2 and longitudinal slides 3 also are located. Also an electrochemical actuator 9 is associated with each of the longitudinal slides 3 of the valve system 1.

Electrochemical actuator 9 has a gas generator 62, that generates a gas, and, in particular, hydrogen, when an electric charge is supplied via corresponding feed lines. The generated gas generates an over-pressure in the interior of the gas generator 62 and a discharge element 58 of the actuator may be displaced in the direction of the valve block 50 via this over-pressure. The discharge element 58 is connected with the gas generator 62 via a bellows element 61.

The discharge element 58 is releasably connected with a holding plate 57 at the end of the discharge element turned away from the gas generator 62. The longitudinal slide 3 is located in the middle of the holding plate 57 and is releasably attached to the latter.

The electrochemical actuator 9 is mounted in an essentially cylindrical housing 17. The latter is closed on its side 18 facing the valve block 15 which a housing cover 19. A sealing element 63 is located between housing 17 and housing cover 19.

The housing cover 19 projects into the valve holding recess 16. The position of the housing cover 19 is established by placing a shoulder 21 of the housing cover 19, projecting radially outward, on a peripheral edge 22 of the valve holding recess 16. The edge 22 forms a part of an outsider 23 of the valve body 15.

The longitudinal slide 3 is movably mounted in the housing cover 19. A connecting end 13 of the longitudinal slide 3 projects into the interior 20 of the housing 17 and there is attached to the holding plate 57. The longitudinal slide 3 extends from its connecting end 13 up to its inlet end 14, that is associated with the feed line 4 in a bottom of the valve holding recess 16.

In FIG. 1 the longitudinal slide 3 is located in its outlet position, in which the feed line 4 is connected via a longitudinal bore 10 in the interior of the longitudinal slide 3 and via connecting lines 11, 12 with outlet chambers 26, 27 in the valve block 15. The longitudinal bore 10 opens in the inlet end 14 and is correspondingly opened in the direction of the feed line 4. The longitudinal bore 10 extends in the longitudinal slide 3 into the housing cover 19. The connecting lines 11, 12 extend radially outward from the longitudinal bore 10 through the body of the longitudinal slide 3 and open in an annular channel 34, that surrounds the longitudinal slide 3. The annular channel 34 is connected via inlets 5, 6 with the inlet channels 26, 27.

The inlets 5, 6 are formed between the housing cover 19 and a central body 28 of the valve body 2 as well as by through bores 31, 32 made in the central body. The through bores 31, 32 are formed in an annular flange 30 of the central body 28, which annular flange is separated from the central body in the direction of the housing cover. A further annular channel 33 is located between the through holes 31, 32 and the outlet channels 26, 27.

The central body 28 has an approximately X-shaped form in the section shown in FIG. 1. Insertion bores 35, 36, into which an inlet elements 37 is inserted, are located approximately in the middle of the central body. Inlet throttle element 37 is made out of a throttle component 38 having a middle bore 39 and a guide body 40. The sealing body 38 may be made as an annular component, that has corresponding middle bores 39 at corresponding points facing the inlet channels 24, 25. The guide body 40 includes a cap element 41 and snap ring 42. The cap element is somewhat dome-shaped in cross-section and overlaps from above an upper end of the sealing body 38. The snap ring 42 is inserted into corresponding grooves in the central body 28 on the upper end of the cap element 41.

A sealing element 43 is located between the cap element 41 and the sealing body 38.

It is to be noted that in the case of the valve system in accordance with the invention altogether four inlet channels, respectively outlet channels via corresponding inlets and outlets as well as via a corresponding number of connecting lines 11, 12 may be connected with the longitudinal bore 10 of the longitudinal slide 3. FIG. 1 shows at least a third connecting line 59, respectively a third insertion 60. In each case these lie opposite the fourth connecting line, respectively insertion bore.

A further annular channel 46 is formed between middle bore 39 and longitudinal slide 3. This channel is formed by a funnel-shaped recess passing in the direction of the middle bore 39.

Further sealing elements 64, respectively 44, 45 are provided for sealing the housing cover 19, respectively the central body 28 in the valve holding recess 60. The sealing elements 44, 45 here also are used for separating the inlets 5, 6 from the outlets 7, 8 and for separating the inlets 5, 6 from the feed line 4.

At this point it is to be noted that in the case of an annular inlet element 37, that completely surrounds the longitudinal slide 3, the central body 28 is made in two parts, half of the central body 28 in FIG. 1 being located to the left of the inlet element 37 and the other half in FIG. 1 being located to the right of the inlet element 37.

On a side surface 48 of the central body 28 facing the bottom of the valve housing recess 16, respectively the feed line 4, the latter is releasably connected with an end washer 49. The latter has a smooth end surface that is mounted with an also smooth bottom surface of the valve holding recess 16, facing the bottom of the valve holding recess 16. A central bore 50, in which the inlet end 14 of the longitudinal slide 3 is movable mounted, is made of approximately the middle of the end washer 49. The central bore 50 is surrounded by an edge 51, that forms a stop 52 for the longitudinal slide 3, on the side of the end washer 49 facing the central body 28. This stop 52 established a fluid feed position 53, see the dashed line representation in FIG. 1, of the longitudinal slide 3. The longitudinal slide 3 is moved in this fluid feed position 53 by the electrochemical actuator 19 as far as possible in the direction of the feed line 4 and partially engages into the feed line 4 with the inlet end 14.

The end washer 49 has an obliquely passing outer edge 54, between which and a rotating corner 55 of the valve holding recess 60 a sealing element 56 is located and held.

The mode of operation of the valve system 1 is briefly described below by means of the figure.

In FIG. 1 an actuation device not shown is connected with the feed line 4. In particular a hydraulic fluid may be fed to, respectively removed from, the actuation device via this line.

The feed line 4 is connected with outlet channels 26, 27 in the valve block 15 in the position of the longitudinal slide 3 shown in FIG. 1. Consequently hydraulic fluid can leave the actuation device.

The connection is made from the feed line 4 via the longitudinal bore 10 of the longitudinal slide 3 and the connecting lines 11, 12 passing radially outward. The further connection from these is made via the annular channel 34 and the outlets 7, 8. The outlets 7, 8 are partially formed between the housing cover 19 and the central body 28 and partially by through bores 31, 32 in the central body 28. A further annular channel 33 is located between the outlet channels 26, 27 and the through bores 31, 32.

Hydrogen is generated in the electrochemical actuator 9 by means of an electric charge. The discharge element 58 is discharged with the holding plate 57 in the direction of the feed line 4 by means of the corresponding over-pressure. Analogously, there is a displacement of the longitudinal slide 3 into the fluid feed position 53. A connection is made in the latter between feed line 4 via longitudinal bore 10 and connecting line 11, 12 to the inlets 5,6 and via the latter to the inlet channels 24, 26. Hydraulic fluid is fed to the actuation device in the fluid feed position 53.

It is also to be noted that there are a number of ball bearings 64 between longitudinal slide 3 and housing cover 19, respectively central body 28 or end washer 49. The cap element 41 of the fixing bar 40 is movably mounted relative to the sealing body 38 by means of ball bearings 65.

The invention claimed is:

1. A valve system comprising:
    at least one valve body;
    a longitudinal slide slidably disposed in the at least one valve body to establish or disrupt a connection between a feed line and at least one inlet or outlet in the valve body;
    an actuator to displace the longitudinal slide, the longitudinal slide having a longitudinal bore which is connected to the feed line;
    the longitudinal bore being selectively linked with the inlet or outlet by the actuator displacing the longitudinal slide;
    at least one connecting line connecting the longitudinal bore and the inlets or outlets, the connecting line extending radially outward from the longitudinal bore through the longitudinal slide; and
    the inlet or outlet opening directly into another longitudinal bore in which the longitudinal slide may be displaced by the actuator,
    wherein the valve system has a number of valve bodies with longitudinal slides and associated actuators located in a valve block for feeding actuation devices with hydraulic fluid,
    wherein a housing for holding the actuator is separated from the valve block,
    wherein the housing is closed on a side facing the valve block by a housing cover through which the longitudinal slide is guided into the interior of the housing, the housing cover being releasably fastened to the valve block,
    wherein the valve body has a central body releasably connected with the housing cover, the longitudinal slide being supported by the central body, housing cover, and a mounting bore, the mounting bore connecting the housing cover and feed line; and
    wherein the central body has at least two inlets and an insertion bore, into which an inlet element is inserted, connecting the longitudinal slide.

2. The valve system according to claim 1, wherein the valve body has a connecting end and an inlet end and is connected at the connecting end with the actuator and wherein the longitudinal bore opens in the inlet end opposite the connecting end.

3. The valve system according to claim 1, wherein the at least one valve body and longitudinal slide are releasably located in a valve holding recess of the valve block.

4. The valve system according to claim 1, wherein the housing cover has a peripheral shoulder engaging an outside surface of the valve block.

5. The valve system according to claim 1, wherein the feed line opens opposite the housing cover into the valve holding recess.

6. The valve system according to claim 1, wherein inlet and outlet channels open into the valve holding recess laterally between feed line and housing cover.

7. The valve system according to claim 1, wherein the valve body has a central body releasably connected with the housing cover, the longitudinal slide being supported by the central body, housing cover, and a mounting bore, the mounting bore connecting the housing cover and feed line.

8. The valve system according to claim 1, wherein the outlet and/or inlet are made in the central body and/or between the central body and the housing cover.

9. The valve system according to claim 1, wherein the outlet and/or inlet in each case are made in pairs lying opposite each other in the valve body.

10. The valve system according to claim 1, wherein in each case two pairs of inlets and outlets are provided in the valve body.

11. The valve system according to claim 1, wherein the central body has an annular flange pointing in the direction of the housing cover, in which flange open through bores are made in the direction of the outlet channel and in the direction of the connecting line.

12. The valve system according to claim 11, wherein an annular channel is located between through bores and the outlet channel.

13. The valve system according to claim 11, wherein an annular channel is located between through bores and the connecting line.

14. The valve system according to claim 1, wherein the inlet element has a sealing body with a middle bore and a guide body holding the sealing body in the insertion bore.

15. The valve system according to claim 14, wherein the guide body has a cap element made essentially dome-shaped in cross-section and a snap ring holding the cap in the insertion bore.

16. The valve system according to claim 15, wherein a sealing element is located between the cap element and sealing body.

17. The valve system according to claim 14, wherein the middle bore is connected by an annular channel facing the longitudinal slide and surrounding the latter.

18. The valve system according to claim 17, wherein the annular channel is made funnel-shaped in cross-section as a recess in the sealing body passing in the direction of the middle bore.

19. The valve system according to claim 1, wherein the inlet element is made essentially annular.

20. The valve system according to claim 1, wherein an end washer, which has a central bore approximately in its middle, is releasably attached to a side surface facing the feed line, the longitudinal slide being movably mounted in the central body.

21. The valve system according to claim 20, wherein an edge of the central bore forms a stop for the longitudinal side in its fluid position.

22. The valve system according to claim 20, wherein the end washer has a chamfered edge and a sealing element is located between the chamfered edge and a rotating corner of the holding recess.

23. The valve system according to claim 1, wherein a holding plate, that is releasably connected with a discharge element of the actuator, is located on the connecting end of longitudinal slide.

24. A valve system comprising:
    a valve block comprising a feed line, a fluid inlet, and a fluid outlet;

a longitudinal slide slidably disposed in said valve block, wherein said longitudinal slide has a longitudinal bore in fluid communication with the feed line;

a connecting line extending radially outward from the longitudinal bore through the longitudinal slide;

an actuator operable to displace the longitudinal slide between a first position wherein said connecting line provides fluid communication between the longitudinal bore and the fluid inlet and a second position where said connecting line provides fluid communication between the longitudinal bore and the fluid outlet;

a housing cover mounted to said valve block;

a central body disposed within said valve block and releasably connected to said housing cover; and inlet elements operable to sealingly engage said longitudinal slide and said central body.

25. The valve system of claim 24 further comprising a mounting hole through said central body and said housing cover, wherein said mounting hole is operable to receive said longitudinal slide and is in fluid communication with the feed line.

26. The valve system of claim 25 further comprising:

an inlet throughbore disposed in said central body and in fluid communication with said mounting hole and the fluid inlet; and an outlet throughbore disposed in said central body and in fluid communication with said mounting hole and the fluid inlet.

27. The valve system of claim 26, wherein the valve block further comprises:

an annular inlet channel in fluid communication with the fluid inlet; and an annular outlet channel in fluid communication with the fluid outlet.

28. The valve system of claim 24, wherein the inlet element comprises:

a sealing body with a middle bore therethrough; and a guide body operable to hold said sealing body within said central body.

29. The valve system of claim 28, wherein the guide body further comprises:

a cap element having an essentially dome-shaped cross-section; and a snap ring operable to hold said cap element within said central body.

30. The valve system of claim 29, wherein the inlet element annularly engages said longitudinal body.

31. A valve system comprising:

a valve block comprising a feed line, a fluid inlet, and a fluid outlet;

a longitudinal slide slidably disposed in said valve block and having a longitudinal bore in fluid communication with the feed line;

a connecting line extending radially outward from the longitudinal bore;

an actuator operable to displace the longitudinal slide between a first position providing fluid communication between the feed line and the fluid inlet, and a second position providing fluid communication between the feed line and a fluid outlet a central body disposed within said valve block, wherein said central body isolates the fluid inlet from the fluid outlet; and an inlet element operable to sealingly engage said longitudinal slide and said central body.

32. The valve system of claim 31, wherein the valve block further comprises:

an annular inlet channel in fluid communication with the fluid inlet; and an annular outlet channel in fluid communication with the fluid outlet.

33. The valve system of claim 31, wherein said inlet elements comprise:

a sealing body with a middle bore therethrough; and a guide body operable to hold said sealing within said central body.

34. The valve system of claim 33, wherein the inlet elements annularly engage said longitudinal body.

* * * * *